United States Patent [19]

Itoh

[11] 4,006,590
[45] Feb. 8, 1977

[54] CONTROL CIRCUIT FOR GAS TURBINE ENGINE

[75] Inventor: Takane Itoh, Yokohama, Japan

[73] Assignee: Nissan Motor Co., Ltd., Yokohama City, Japan

[22] Filed: May 21, 1975

[21] Appl. No.: 579,709

[30] Foreign Application Priority Data

June 13, 1974  Japan .............................. 49-66555

[52] U.S. Cl. ..................... 60/39.28 R; 60/39.28 T
[51] Int. Cl.² .......................................... F02C 9/08
[58] Field of Search ............... 60/39.28 T, 39.28 R; 415/10, 17; 290/40 A, 40 D

[56] References Cited

UNITED STATES PATENTS

| 2,948,114 | 8/1960 | Beslier | 60/39.28 T |
| 2,971,335 | 2/1961 | Polye | 60/39.28 T |
| 3,063,243 | 11/1962 | Bancroft | 60/39.28 T |
| 3,739,250 | 6/1973 | Beadman | 60/39.28 T |
| 3,832,846 | 9/1974 | Leeson | 60/39.28 R |
| 3,861,363 | 1/1975 | Williams | 60/39.28 R |

*Primary Examiner*—Clarence R. Gordon

[57] ABSTRACT

A control circuit for controlling output speed of a gas turbine engine through comparison between a signal representative of an actually detected output speed of the engine and a signal representative of a desired engine output speed, wherein the rate of increase of the latter signal is limited in accordance with a predetermined schedule depending upon a detected temperature of the engine and a predetermined engine temperature which varies with a preselected operating condition such as the detected output speed of the engine. The control circuit is characterized in that the same is at all times maintained as a closed-loop system although switching means is provided in the circuit.

7 Claims, 4 Drawing Figures

CONTROL CIRCUIT FOR GAS TURBINE ENGINE

The present invention relates to gas turbine engines and, more particularly, to a control circuit for controlling output speed of a gas turbine engine.

Conventional speed control circuits for use with gas turbine engines are usually constructed as closed-loop systems which are arranged in such a manner as to regulate the supply rate of fuel to the engine by means of an analog signal representative of a difference between a detected output speed of the engine and a desired engine output speed which is determined in accordance with a predetermined schedule depending upon preselected operating conditions of the engine. The control circuit thus operates merely on the basis of the detected and desired output speeds of the gas turbine engine but, as is well known in the art, it is preferable that the output speed of the gas turbine engine be controlled on the basis of other operational factors of the engine such as the engine temperature for the purpose of preventing production of abrupt vibrations (called surging) in the compressor of the engine and preventing an undue rise of the engine temperature as would be caused when the engine is to be accelerated at a relatively high rate. An advanced version of the control circuit has therefore been proposed which features switching means by which the output speed of the gas turbine engine is controlled on the basis of a parameter not related to the desired output speed of the engine but related to a certain operating condition of the engine such as for example the actual, or detected, output speed of the engine. A problem is, however, still encountered by such an advanced version of the control circuit in that the circle becomes an open-loop system when the switching means is actuated to control the engine speed on the basis of the above mentioned parameter so that the engine fails to be controlled in a stable condition during a transient condition in which the control circuit for the engine is being shifted from the closed-loop system to the open-loop system. The present invention contemplates elimination of all these drawbacks that have been inherent in the prior art control circuits for the gas turbine engines.

It is, accordingly, an important object of the present invention to provide an improved gas turbine engine speed control circuit which is at all times maintained as a closed-loop system and which is thus operated in stable condition irrespective of the signals produced by the control circuit.

It is another important object of the present invention to provide an improved gas turbine engine speed control circuit which is adapted not only to properly and reliably control the output speed of the gas turbine engine but to prevent surging of the engine compressor and an undue rise of the engine temperature.

In accordance with the present invention, these objects will be advantageously accomplished in a control circuit which comprises in combination first sensing means for detecting output speed of the gas turbine engine and producing an output signal representative of the detected engine speed, second sensing means for detecting temperature of the engine and producing an output signal representative of the detected engine temperature, first signal generating means for producing an output signal representative of a desired output speed of the engine, second signal generating means responsive to the signals from the first and second sensing means for producing an output signal representative of a difference between the detected engine temperature represented by the output signal from the second sensing means and a predetermined engine temperature varying with the detected output speed of the engine in accordance with a predetermined schedule, first switching means having a first operative condition connected to the first signal generating means and a second operative condition connected to the second signal generating means, an integrating circuit having an input terminal connected to the first and second signal generating means across said first switching means, second switching means connected across the integrating circuit for bypassing the integrating circuit when closed, triggering means having input terminals connected to the first sensing means and the first and second signal generating means for producing a trigger signal responsive to a condition in which the desired engine speed represented by the signal from the first signal generating means is higher than the detected engine speed represented by the output signal from the first sensing means by a value which is related to the detected engine speed and the detected engine temperature, the first switching means being connected to the triggering means for being held in the first operative condition in the absence of the trigger signal from the triggering means and shifted to the second operative condition in the presence of the trigger signal from the triggering means, the second switching means being connected to the triggering means for being held closed in the absence of the trigger signal from the triggering means and open in the presence of the trigger signal from the triggering means, and comparing means having a first input terminal connected in parallel to the integrating circuit and the second switching means and a second input terminal connected to the first sensing means for producing an engine speed control signal representative of a difference between the signals appearing at the first and second input terminals thereof.

The second signal generating means incorporated into the engine speed control circuit thus constructed may comprise a function generator responsive to the output signal from the first sensing means for producing an output signal representative of the predetermined engine temperature, and a comparator having a first input terminal connected to the function generator and a second input terminal connected to the second sensing means for producing the signal representative of the difference between the output signals from the function generator and the second sensing means.

On the other hand, the above mentioned triggering means may comprise a computing circuit which is operative to produce the trigger signal responsive to a condition in which the output signal from the first signal generating means is higher than the output signal from the first sensing means by a value which is proportional to the output signal from the comparator.

The integrating circuit also incorporated into the control circuit according to the present invention may comprise a series combination of a resistor and a capacitor which are connected between the above mentioned second switching means and the comparing means. In this instance, the previously mentioned second switching means may comprise a series combination of a resistor and a normally-closed switch which is connected across the above mentioned capacitor and which has a trigger terminal connected to the triggering means for being actuated to open in response to the trigger signal delivered from the triggering means.

The features and advantages of the engine speed control circuit according to the present invention will become more apparent from the following description in which like reference numerals designate corresponding circuit component and in which.

Figure 1:
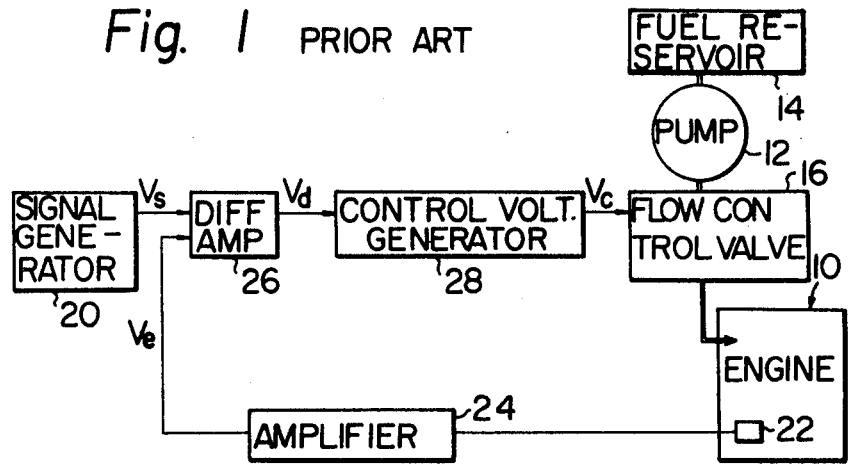
FIG. 1 is a block diagram showing an example of a prior art speed control circuit for a gas turbine engine.

Referring to the drawings, particularly to FIG. 1, a gas turbine engine 10 is shown to have a fuel supply system which comprises a fuel pump 12 having a suction side connected to a fuel reservoir 14 and a discharge side connected over a fuel flow control valve 16 to the fuel injection nozzle (not shown) of the engine 10 through a fuel feed line 18. The output speed of the gas turbine 10 is controlled by regulating the rate of flow of fuel through the fuel flow control valve 16. A conventional engine speed control circuit is, thus, adapted to control the rate of flow of fuel through the fuel flow control valve 16. The control circuit comprises a signal generator 20 which is arranged to produce a signal voltage $Es$ proportional to the fuel supply rate to provide a desired output speed of the engine 10. The output speed of the engine 10 is detected by means of an engine speed sensor 22 which is adapted to produce an output voltage proportional to the detected output speed of the engine 10. The engine speed sensor 22 is connected to an amplifier 24 so that the output voltage of the sensor 22 is amplified into a voltage $Ve$ which is also proportional to the detected engine speed. The signal voltages $Vs$ and $Ve$ thus delivered from the signal generator 20 and the amplifier 24 are fed to first and second input terminals of a comparator such as for example a differential amplifier 26. The differential amplifier 26 is adapted to compare the two input voltages $Vs$ and $Ve$ with each other and to produce an output voltage $Vd$ which is equal to the difference between the voltages $Vs$ and $Ve$. The output voltage $Vd$ produced by the differential amplifier 26 is, thus, indicative of the difference between the desired and detected output speeds of the gas turbine engine 10. The differential amplifier 26 has an output terminal connected to a control voltage generator 28 which is adapted to produce an output voltage $Vc$ proportional to the output voltage $Vd$ of the differential amplifier 26. The fuel flow control valve 16 is assumed to have an electromagnetically operated actuating element (not shown) connected to the output terminal of the control voltage generator 28. The rate of flow of the fuel through the valve 16 is thus regulated in accordance with the magnitude and polarity of the voltage $Vc$ thus impressed on the valve 16 from the control voltage generator 28.

From the above description it will be understood that the conventional speed control circuit of a gas turbine engine 10 is so arranged as to control the supply of fuel to the engine simply on the basis of the desired and detected output speeds of the engine. As is well known in the art of gas turbine engines, however, there are other important factors which should be taken into consideration in controlling the output speed of the engine. Such important considerations include prevention of the occurrence of violent vibrations or "surging" in the compressor of the engine or prevention of an undue rise of the temperature of the engine. If, for example, the signal voltage $Vs$ delivered from the signal generator 20 of the control circuit happens to be suddenly increased over the signal voltage $Ve$ representative of the detected output speed of the engine 10, there will result an abrupt increase in the output voltage $Vd$ from the differential amplifier 26 and accordingly the output voltage $Vc$ from the control voltage generator 28 so that an abruptly increased amount of fuel will be supplied to the engine 10 within a short period of time. This will cause the compressor of the engine 10 to surge violently or result in an undue rise of the engine temperature.

Figure 2:
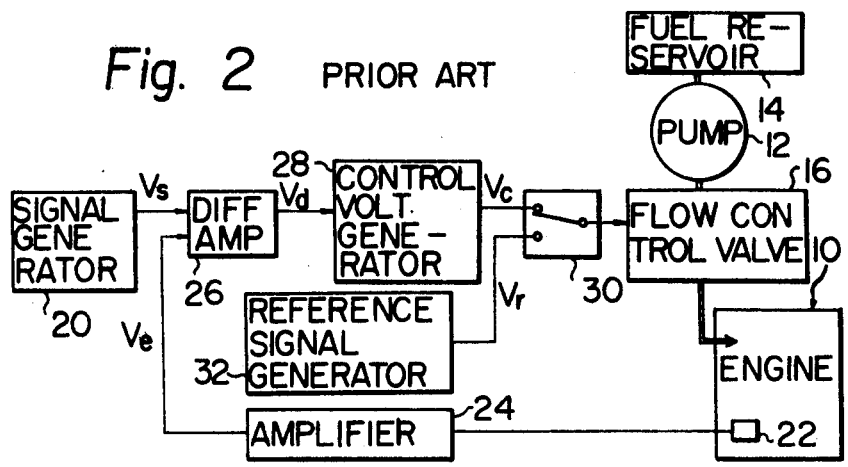
FIG. 2 is a block diagram showing another example of a prior art speed control circuit for a gas turbine engine.

FIG. 2 shows an advanced version of the engine speed control circuit which has been conventionally proposed with a view to providing a solution to the above mentioned problems. The advanced engine speed control circuit shown in FIG. 2 comprises, in addition to the components incorporated in the control circuit shown in FIG. 1, a switching circuit 30 which is connected between the control voltage generator 28 and the electromagnetically operated actuating element (not shown) of the fuel flow control valve 16. The switching circuit 30 has a first input terminal connected to the output terminal of the control voltage generator 28 and a second input terminal connected to a reference voltage generator 32. The reference voltage generator 32 is adapted to produce a reference voltage $Vr$ which varies depending upon prescribed operating conditions such as the output speed of the gas turbine engine 10. The switching circuit 30 is thus shifted into a first condition providing connection between the control voltage generator 28 and the fuel control valve 16 if the output voltage $Vc$ from the control voltage generator 28 is lower than the reference voltage $Vr$ and into a second condition providing connection between the reference voltage generator 32 and the fuel flow control valve 16 if the output voltage $Vc$ from the control voltage generator 28 is higher than the reference voltage $Vr$. The fuel flow control valve 16 is thus energized with a voltage which is at all times not higher than the reference voltage $Vr$ because of the switching actions of the switching circuit 30. If, therefore, the reference voltage $Vr$ produced by the reference voltage generator 32 is varied in accordance with a predetermined schedule related to the preselected operating conditions of the engine 10, the surging of the compressor of the engine and an undue rise of the temperature of the engine could be prevented even when the signal voltage $Vs$ delivered from the signal generator 20 may be abruptly increased over the signal voltage $Ve$ representative of the actual output speed of the gas turbine engine 10. In spite of the advantage which can thus be achieved, the prior art control circuit of the nature shown in FIG. 2 still has a drawback in that the same is shifted between closed-loop and open-loop systems when the switching circuit 30 is initiated into action between the above mentioned first and second conditions thereof. During a transient condition in which the control circuit is being shifted from the closed-loop system to the open-loop system or vice versa, the control circuit is unable to properly and stably control the fuel flow control valve 16 so that the performance efficiency of the gas turbine engine 10 will be critically impaired. The goal of the present invention is to provide a control circuit which is free from all these drawbacks inherent in the prior art control circuit shown in FIG. 1 or 2.

Figure 3:
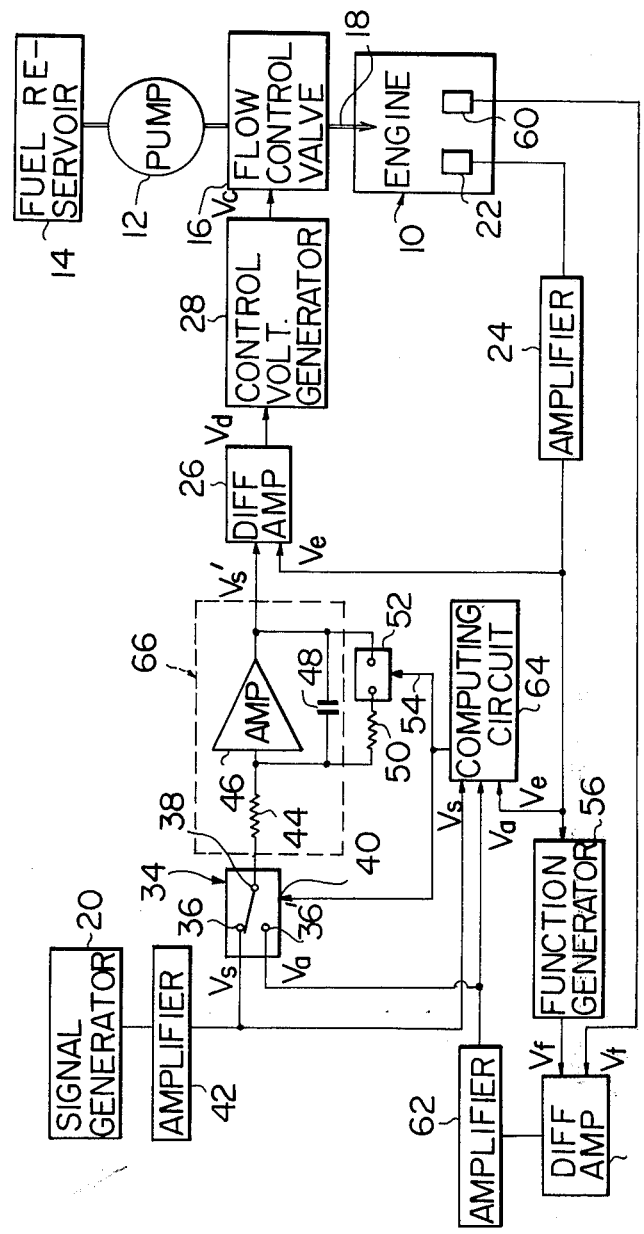
FIG. 3 is a block diagram which illustrates a preferred embodiment of the speed control circuit according to the present invention.

Referring to FIG. 3, the speed control circuit embodying the present invention comprises all the components of the prior art control circuit of the nature shown in FIG. 1, including a signal generator 20, an engine speed sensor 22, an amplifier 24, a differential amplifier 26, and a control voltage generator 28. As previously described with reference to FIG. 1, the signal generator 20 is adapted to produce a signal voltage $Vs$ which is proportional to or otherwise representative of a fuel supply rate optimum for achieving a desired output speed of the gas turbine engine 10, whereas the amplifier 24 connected to the engine speed sensor 22 is adapted to produce a signal voltage $Ve$ proportional to or otherwise representative of the output speed of the engine 10 as detected by the engine speed sensor 22.

The engine speed control circuit embodying the present invention further comprises a two-position switching circuit 34 which has first and second input terminals 36 and 36', an output terminal 38 and a trigger terminal 40 and which is adapted to be shifted between a first operative condition providing connection between the first input terminal 36 and the output terminal 38 and a second operative condition providing connection between the second input terminal 36' and the output terminal 38. The switching circuit 34 is shifted to the first operative condition in the absence of a trigger signal $St$ at the trigger terminal 40 thereof and to the second operative condition in the presence of the trigger signal $St$ at the trigger terminal 40, as will be described in more detail. The first input terminal 36 of the switching circuit 34 is connected to the output terminal of the previously described signal generator 20 preferably across an amplifier 42 as shown. The output terminal 38 of the switching circuit 34 is connected to the previously mentioned first input terminal of the differential amplifier 26 through a resistor 44 and a parallel combination of an operational amplifier 46, a capacitor 48 and a series combination of a resistor 50 and a normally-closed switch 52. The normally-closed switch 52 has a trigger terminal 54 and is caused to open in the presence of the previously mentioned trigger signal $St$ at the trigger terminal 54.

Figure 4:
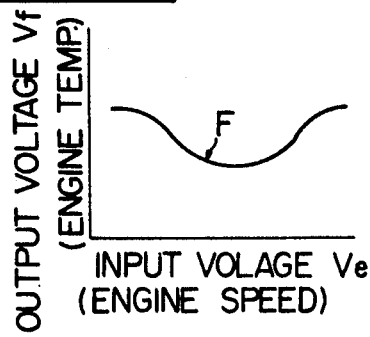
FIG. 4 is a graph which shows a schedule in accordance with which a signal voltage representative of a predetermined engine temperature is produced on the basis of detected output speed of a gas turbine engine in the speed control circuit which is shown in FIG. 3.

The amplifier 24 connected between the engine speed sensor 22 and the differential amplifier 26 is also connected to a function generator 56 which is thus supplied with the voltage $Ve$ representative of the output speed of the engine 10 as detected by the engine speed sensor 22. The function generator 56 is arranged in such a manner as to produce an output voltage $Vf$ which varies with the input voltage $Ve$ in accordance with a predetermined schedule an example of which is illustrated in FIG. 4. As indicated by curve F shown in FIG. 4, the output voltage $Vf$ of the function generator 56 has a general tendency increasing as the input voltage $Ve$, viz., the detected output speed of the engine 10 increases or decreases from a medium range in which the voltage $Vf$ assumes a lowest value.

Turning back to FIG. 3, the engine speed control circuit embodying the present invention further comprises a comparator such as a differential amplifier 58 which has a first input terminal connected to the output terminal of the above mentioned function generator 56 and a second input terminal connected to an engine temperature sensor 60. The engine temperature sensor 60 is sensitive to the temperature of the gas turbine engine 10 and produces an output voltage $Vt$ which is proportional to or otherwise representative of the detected temperature of the engine 10. The temperature of the engine 10 to be detected by the sensor 60 may be the maximum temperature produced in the engine during each of the cycles of operation of the engine, the temperature of the gas at the inlet to the turbine, or the temperature of the exhaust gases from the engine. The voltages $Vf$ and $Vt$ thus produced by the function generator 56 and the engine temperature sensor 60, respectively, are fed to the differential amplifier 58 which is adapted to compare the two input voltages $Vf$ and $Vt$ with each other and produce an output voltage which is equal to the difference between the voltages $Vf$ and $Vt$. The differential amplifier 58 has an output terminal connected through an amplifier 62 to the previously mentioned second input terminal 36' of the switching circuit 34. The output voltage of the differential amplifier 58 is, accordingly, in direct proportion to the difference between the detected temperature of the gas turbine engine 10 and a predetermined value which varies with the detected output speed of the engine in accordance with the schedule indicated by the curve F of FIG. 4. If, thus, the gain achieved by the amplifier 62 is $K_1$, then the amplifier 62 will produce an output voltage $Va$ which is given by an equation $$Va = K_1(Vf - Vt). \tag{1}$$

The engine speed control circuit shown in FIG. 3 further comprises a computing circuit 64 which has a first input terminal connected to the output terminal of the previously mentioned amplifier 42 (or directly to the signal generator 20 is the amplifier 42 is removed), a second input terminal connected to the above mentioned amplifier 62, and a third input terminal connected to the amplifier 24. The computing circuit 64 is, thus, supplied with the signal voltage $Vs$ representative of a desired output speed of the gas turbine engine 10, the signal voltage $Va$ given by Eq. 1, and the signal voltage $Ve$ representative of the detected output speed of the engine 10. The computing circuit 64 has an output terminal connected to the respective trigger terminals 40 and 54 of the previously mentioned two-position switching circuit 34 and the normally-closed switch 52 and is arranged in such a manner as to produce the previously mentioned trigger signal $St$ when, and only when, the following relation is satisfied among the three input voltages $Vs$, $Va$ and $Ve$:

$$Vs - Ve > K_2 \cdot Va, \tag{2}$$

where $K_2$ is a constant which is determined by the performance characteristics of the gas turbine engine 10. By preference, the constant $K_2$ may be selected as a function of the detected output speed and the detected temperature of the engine and may be preferably given by $$K_2 = dVe/dVt, \tag{3}$$

where $dVe$ and $dVt$ are the differentials of the voltages $Ve$ and $Vt$, respectively.

When, now, the desired output of the gas turbine engine 10 is approximately equal to or higher by only a limited value than the detected output speed of the engine 10 as in the case where the engine 10 is being operated under steady-load conditions or is to be accelerated at a moderate rate, the voltage corresponding to $Vs - Ve$ is maintained at a relatively low level so that the above mentioned relation (2) will not hold.. As a consequence, the computing circuit 64 produces no output signal at its output terminal connected to the respective trigger terminals 40 and 54 of the two-position switching circuit 34 and the normally-closed switch 52. The two-position switching circuit 34 is therefore held in the previously mentioned first operative condition providing connection between the first input terminal 36 and the output 38 in the absence of its trigger terminal 40 and, at the same time, the normally-closed switch 52 is held closed in the absence of its trigger terminal 54. Under these conditions, the differential amplifier 26 has it first input terminal supplied with an input voltage $Vs'$ which is given by an equation $$Vs' = \frac{R_2/R_1}{1 + C \cdot R_2} \cdot Vs , \qquad (4)$$

where C is the capacitance of the capacitor 48 and $R_1$ and $R_2$ is the resistance values of the resistors 44 and 50, respectively. If, in this instance, the capacitor 48 and the resistors 44 and 50 are so selected that the time constant $C.R_2$ is negligibly small and the two resistors 44 and 50 have substantially equal resistance values so that $C.R_2 \doteq O$ and $R_1 \doteq R_2$, then the equation 4 may be re-written as $Vs' \doteq Vs$. This means that the signal voltage Vs representative of the desired output speed of the gas turbine engine 10 is transmitted without a substantial modification to the first input terminal of the differential amplifier 26 serving as a comparator. The fuel flow control valve 16 for the engine 10 is, thus controlled essentially in the same manner as the fuel flow control valve which is controlled by the conventional control circuit shown in FIG. 1 when the desired output speed of the engine is not far higher than the detected output speed of the engine.

When, however, the desired output speed of the gas turbine engine 10 becomes far higher than the detected output speed of the engine 10 as in the case where the gas turbine engine 10 is to be accelerated at a relatively high rate, then the voltage corresponding to $Vs - Ve$ exceeds a predetermined limit which is given by $K_2$. Va in the relation 2. The computing circuit 64 thus produces an output signal whereby the two-position switching circuit 34 is shifted from the first operative condition to the second operative condition providing connection between the second input terminal 36' and the output terminal 38 thereof in the presence of the trigger signal St at its trigger terminal 40 and simultaneously the normally-closed switch 52 is caused to open in the presence of the trigger signal St at its trigger terminal 54. Under these conditions, the resistor 44, the amplifier 46 and the capacitor 48 constitute, in combination, an integrating circuit 66 which is connected through the second input terminal 36' of the switching circuit 34 to the output terminal of the amplifier 62 producing the output voltage Va which is given by the previously mentioned equation 1. The voltage $Vs'$ impressed on the first input terminal of the differential amplifier 26 connected to the output terminal of the integrating circuit 66 is therefore given by $$Vs' = Vso + \frac{1}{R_1 \cdot C} \int_o^t Vadt , \qquad (5)$$

where Vso is the voltage which is present at the first input terminal of the differential amplifier 26 immediately before the switching circuit 34 is shifted from the first to second operative condition. From the equation 5 it will be apparent that, if the value of $R_1.C$ is appropriately selected, the fuel flow control valve 16 can be controlled without respect to the rate of change of the signal voltage Vs delivered through the amplifier 42 from the signal generator 20. Substituting the equation 1 into the equation 5, furthermore, the following relation is obtained:

$$Vs' = Vso + \frac{K_1}{R_1 \cdot C} \int_o^t (Vf - Vt) dt . \qquad (6)$$

From this it will be understood that the voltage $Vs'$ impressed on the first input terminal of the differential amplifier 26 varies with the value of $Vf - Vt$ and is maintained constant when the value $Vf - Vt$ becomes zero, viz., when the detected temperature of the gas turbine engine 10 reaches a predetermined level which is dictated by the voltage Vf in accordance with the schedule indicated by curve F of FIG. 4.

From the above description it will now be appreciated that the output speed of the gas turbine engine provided with the control circuit embodying the present invention can be at all times controlled in a stable condition because the control circuit is maintained as a closed-loop system not only when the fuel flow control valve 16 is under the control of the signal delivered from the signal generator 20 but when the valve 16 is controlled by the signal voltage Va.

What is claimed is:

1. A control circuit for controlling output speed of a gas turbine engine, comprising in combination first sensing means for detecting output speed of the gas turbine engine and producing an output signal representative of the detected engine speed, second sensing means for detecting temperature of the engine and producing an output signal representative of the detected engine temperature, first signal generating means for producing an output signal representative of a desired output speed of the engine, second signal generating means responsive to the signals from the first and second sensing means for producing an output signal representative of a difference between the detected engine temperature represented by the output signal from said second sensing means and a predetermined engine temperature varying with the detected output speed of the engine in accordance with a predetermined schedule, first switching means having a first operative condition connected to said first signal generating means and a second operative condition connected to said second signal generating means, an integrating circuit having an input terminal connected to said first and second signal generating means across said first switching means, second switching means connected across the integrating circuit for bypassing the integrating circuit when closed, triggering means having input terminals connected to said first sensing means and said first and second signal generating means for producing a trigger signal responsive to a condition in which the desired engine speed represented by the signal from said first signal generating means is higher than the detected engine speed represented by the output signal from said first sensing means by a value which is related to the detected engine speed and the detected engine temperature, said first switching means being connected to said triggering means for being held in said first operative condition in the absence of the trigger signal from said triggering means and shifted to said second operative condition in the presence of the trigger signal from the triggering means, said second switching means being connected to said triggering means for being held closed in the absence of the trigger signal from the triggering means and open in the presence of the trigger signal from the triggering means, and comparing means having a first input terminal connected in parallel to said integrating circuit and said second switching means and a second input terminal connected to said first sensing means for producing an engine speed control signal representative of a difference between the signals appearing at the first and second input terminals thereof.

2. A control circuit as claimed in claim 1, in which said second signal generating means comprise a function generator responsive to the output signal from said first sensing means for producing an output signal representative of said predetermined engine temperature, and a differential amplifier having a first input terminal connected to said function generator and a second input terminal connected to said second sensing means for producing said signal representative of the difference between the output signals from said function generator and said second sensing means.

3. A control circuit as claimed in claim 2, in which said triggering means comprise a computing circuit which is operative to produce said trigger signal responsive to a condition in which the output signal from said first signal generating means is higher than said output signal from said first sensing means by a value which is proportional to the output signal from said comparator.

4. A control circuit as claimed in claim 1, in which said integrating circuit comprises an operational amplifier bypassed by a capacitor and having the input terminal thereof connected through a resistor to said first switching means and the output terminal thereof connected to said comparing means.

5. A control circuit as claimed in claim 4, in which said second switching means comprise a series combination of a resistor and a normally-closed switch connected across said capacitor, said normally-closed switch having a trigger terminal connected to said triggering means for being actuated to open responsive to the trigger signal from the triggering means.

6. A control circuit as claimed in claim 4, in which the series combination of said resistor and said capacitor has a time constant which is substantially negligible.

7. A control circuit as claimed in claim 5, in which said two resistors have substantially equal resistance values.

* * * * *